Patented Jan. 9, 1923.

1,441,789

UNITED STATES PATENT OFFICE.

HAROLD DOUBLEDAY, OF TRYON, NORTH CAROLINA.

FLEXIBLE HAND CULTIVATOR.

Application filed January 14, 1922. Serial No. 529,396.

*To all whom it may concern:*

Be it known that I, HAROLD DOUBLEDAY, a citizen of the United States, residing in the city of Tryon and State of North Carolina, have invented new and useful Improvements in Flexible Hand Cultivators, of which the following is a specification, reference being had to the accompanying drawings.

This invention is a flexible hand cultivator for garden use, and the object is to provide a relatively light hand cultivator, carrying a light gasoline engine for operating the cultivator disks, and embodying a flexible shaft at the end whereof the disks are rotatably mounted; and by means of which shaft the disks may be moved laterally as the machine proceeds along the row of vegetables, for the purpose of cutting away weeds and loosening up the soil between the plants in the same row, as well as between the rows themselves.

Figure 1:
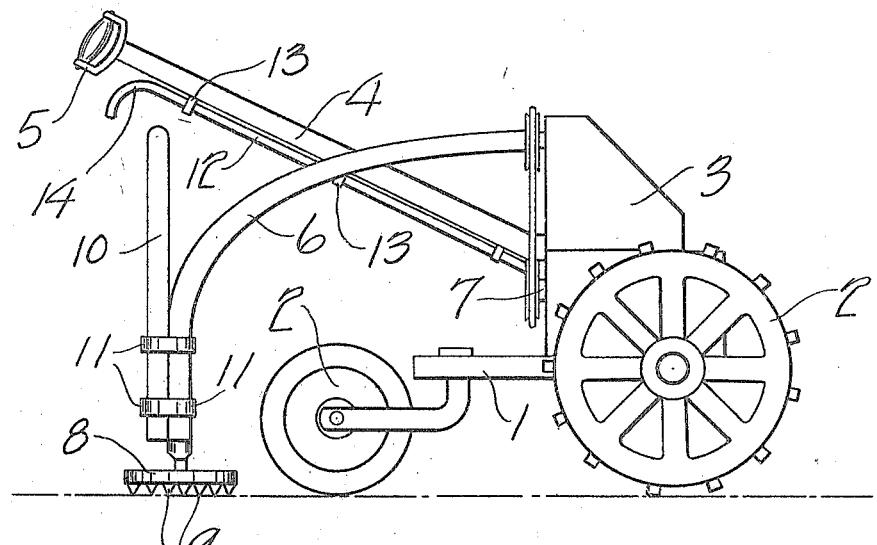
Figure 1 is a side elevation of the cultivator.
Figure 2:
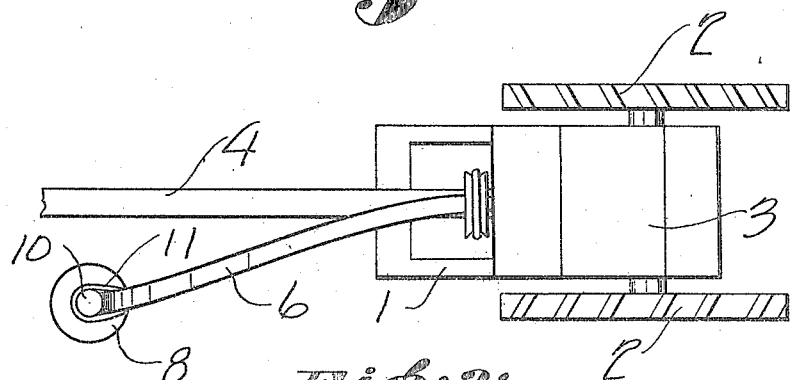
Figure 2 is a plan view.
Figure 3:
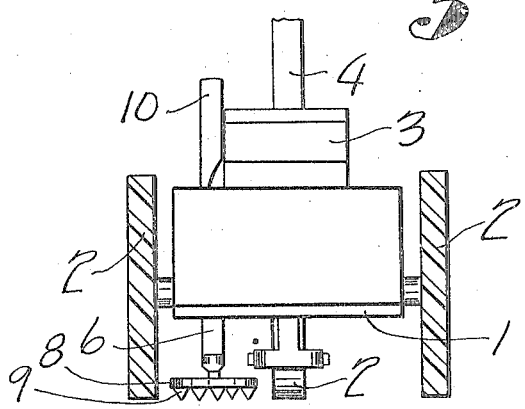
Figure 3 is a front view.

In carrying out this invention a light chassis 1 is provided, having a set of front tractor wheels 2, and a rear castor wheel 2ª, and carrying a light gasoline engine 3. Tractive power is transmitted from the engine to the wheels in any ordinary manner, for the purpose of propelling the cultivator along the ground. A handle bar 4 extends from the chassis rearwardly and ends in the grip handle 5, used for steering the machine along between the rows. A flexible shaft 6 is connected to the drive shaft 7 of the engine, or is otherwise driven by the engine, and extends thence backwardly and downwardly, and carries at its free end a cultivator disk 8 having cutting teeth 9 arranged on its under side. The disk 8 may be made detachable from the shaft 6 in any conventional manner, and thus interchangeable disks of variously designed cutting teeth may be provided and mounted at will on the shaft. An adjusting and operating handle 10 is secured at 11 to the end of the flexible shaft 6 and extends up to the hand of the operator. An engine throttle rod 12 slides in the brackets 13 on the bar 4, and ends in a hook 14 immediately under the handle 5, thus affording means for the ready control of the engine.

The operation and use of the machine is apparent from the foregoing description.

While I have herein described a certain specific method of constructing and assembling the elements of my invention, it is understood same may be varied in minor details, not departing from the spirit of my invention as defined in the appended claims.

I claim:

1. A flexible hand cultivator, comprising a light chassis and engine; a grip handle extended backwardly from the chassis; a flexible shaft connected with the engine shaft and extended back and down; a cultivator disk attached to the free end of the flexible shaft; and an operating handle attached to the lower end of the flexible shaft independently of the connection of the disk.

2. A flexible hand cultivator, comprising a light chassis and engine, the two being tractively connected; a grip handle attached to and extended back from the chassis; a throttle rod slidingly attached to the handle; a flexible shaft operable by the engine and extended back and down; a toothed cultivator disk releasably attached to the free end of the flexible shaft; and an operating handle attached to the lower end of the flexible shaft independently of the connection of the disk.

3. A hand cultivator including a light chassis having front traction wheels and provided with a rear castor wheel, an engine mounted on the chassis and connected with the traction wheels, a flexible shaft extending downwardly and rearwardly from the engine over the castor wheel, a toothed cultivator disk detachably connected to the lower end of the flexible shaft, a handle secured to the lower end of the flexible shaft independently of the attachment of the cultivator disk, and a separate handle connected with the chassis and having a grip located adjacent the upper end of the said handle.

HAROLD DOUBLEDAY.

Witnesses:
J. FOSTER SEARLES,
W. F. LITTLE.